United States Patent [19]

Nakao et al.

[11] 4,102,021
[45] Jul. 25, 1978

[54] METHOD FOR MAKING CAPACITORS WITH PLATED TERMINALS

[75] Inventors: Kaname Nakao, Neyagawa; Tanejiro Ikeda, Higashi-Osaka; Koichi Kawata, Sakai; Shoji Hara, Hirakata, all of Japan

[73] Assignee: Matsushita Electric Industrial Co., Ltd., Osaka, Japan

[21] Appl. No.: 728,177

[22] Filed: Sep. 30, 1976

[30] Foreign Application Priority Data

Oct. 6, 1975 [JP] Japan .................................. 50-120996
Mar. 31, 1976 [JP] Japan .................................. 51-36416
Jun. 14, 1976 [JP] Japan .................................. 51-70049

[51] Int. Cl.² .............................................. H01G 4/06
[52] U.S. Cl. ................................... 29/25.42; 361/309; 427/79
[58] Field of Search ....... 361/309, 308, 304, 323 (U.S. only);29/25.42; 427/79-81

[56] References Cited

U.S. PATENT DOCUMENTS

| | | | |
|---|---|---|---|
| 1,479,315 | 1/1924 | Pickard | 361/304 |
| 2,585,752 | 2/1952 | Dorst | 29/25.42 |
| 3,583,361 | 6/1971 | Lauder | 219/121 EB |
| 3,883,937 | 5/1975 | Alexander | 361/293 |
| 3,891,901 | 6/1975 | Booe | 361/323 |
| 3,992,761 | 11/1976 | McElroy | 29/25.42 |

Primary Examiner—E. A. Goldberg
Attorney, Agent, or Firm—Burgess, Ryan and Wayne

[57] ABSTRACT

The present invention discloses a film capacitor and a method for making the same. A capacitor element formed by rolling or laminating metalized films less than 3.5 microns in thickness has ends coated with ion plating to form block terminals so that the strong bonds between the ends of the capacitor element and the terminals may be obtained with the resultant decrease in contact resistance therebetween. In order to increase the mechanical strength of the terminals a conducting layer may be formed on the terminals by metal spraying, and in order to increase the bond the ends of the capacitor element may be subjected to etching prior to ion plating so that the roughed end faces offer teeth to which the metal terminals cling. Thus the present invention provides a film capacitor which is considerably compact in size, light in weight yet highly reliable and dependable in operation and inexpensive to manufacture.

5 Claims, 11 Drawing Figures

METHOD FOR MAKING CAPACITORS WITH PLATED TERMINALS

BACKGROUND OF THE INVENTION

The present invention relates to a capacitor having terminals formed by ion plating and a method for making the same.

The essential components of capacitors which store electric energy are dielectric, conductors and leads. In general the so-called film capacitors may be divided into roll and stacked types. The roll type film capacitors are fabricated by depositing metal over one major surface of film made of polyester or the like, cutting the metal coated film and forming the film strips into a roll. The stacked type film capacitors are fabricated by laminating the metal coated films and cut the lamination into a desired shape. In both the roll and stacked type film capacitors terminals are formed on opposed end faces for connection with lead wires. In addition, the terminals serve to maintain the integrity of the rolled or laminated films (to be referred to as "a capacitor element" in this specification) in the original shape and to interconnect electrically between the metal coatings on the films in case of the stacked type. So far the terminals have been generally formed by metal spraying in which molten metal is atomized by compressed air and molten droplets of metal are thrown with a continuous stream of compressed air against the end face of a capacitor element. More particularly, Zn or zinc particles are sprayed over the end face of a capacitor element at an angle from one direction and then from the opposite direction. Thereafter two layers of Sn are formed in like manner. The coated terminals have a thickness of 0.5 mm.

In metal spraying, the finest particle size ranges between 5 and 50 microns so that when the surface to be coated is smooth, a poor bond results. Further problems of the metal spraying techniques are that working conditions are rather harmful to the health of workers and that the yield is poor.

In the meantime, there has been proposed to reduce the thickness of films in order to fabricate film capacitors which are compact in size, light in weight yet highly reliable and dependable in operation and inexpensive to manufacture.

The static capacitance C is given by $$C = ES/t$$

where
- $E$ = dielectric constant,
- $S$ = area of opposed electrodes, and
- $t$ = thickness of dielectric.

Therefore, the volume of a capacitor may be decreased by reducing the thickness of film, and the area of film may be decreased by the reduction of the area of opposed electrodes required for obtaining the same static capacitance. As a consequence, the capacitors can be made more compact in size and light in weight by the reduction in thickness of film. For instance, the volume of a capacitor made with film 3.5 microns in thickness is about one eighth as small as the volume of a capacitor made with film 10 microns in thickness and having the same capacitance.

However, some problems arise when the capacitors formed with film 3.5 microns in thickness are coated by the conventional metal spraying methods for forming block terminals or electrodes at the ends of the capacitors. In case of the rolled type film capacitors, the deviation in alignment of film edges is generally less than 0.5 mm so that the bond between the block terminal and the end faces of a capacitor is weak and the contact resistance is high. As a result, power loss increases and accordingly the factor tan δ representative of the power loss increases. The reason why the bond between the terminals and the ends of the capacitor element is weak when the deviation in alignment of film edge is less than 0.5 mm is that in metal spraying molten droplets of metal are 5 to 50 microns in size so that they cannot enter the space between the adjacent films with the resulting decrease in mechanical bond and increase in contact resistance. However, in practice, the film edges are bent more or less because the metal particles force between them, but with the deviation in alignment of film edges of less than 0.5 mm, the film edges are not satisfactorily bent to ensure the desired bond and a low resistance.

The weak bond between the smooth ends of a capacitor element and the block terminals proves the considerable dependence of bonded strength upon the misalignment of film edges which offers teeth to which the terminals cling and upon the misregistration of films. However, it is not preferable to increase the misalignment of film edges because the step for forming capacitor elements becomes complex, the variation in dimensional accuracies increases, and the yield is poor.

SUMMARY OF THE INVENTION

In view of the above, one of the present invention is to provide a capacitor formed with block terminals by ion plating when metal spraying cannot be employed in forming terminals because of the conditions of the ends (which shall be referred to as "end faces" in this specification hereinafter).

Another object of the present invention is to provide a capacitor having improved characteristics by forming a conducting layer over an electrode layer formed by ion plating, thereby increasing the mechanical strength of the electrodes.

A further object of the present invention is to provide a capacitor which has a strong bond between the end faces and electrodes and a low contact resistance even when the deviation in alignment of film edges is less than 0.5 mm, whereby tan δ may be considerably improved.

A further object of the present invention is to improve the characteristics of the capacitors by etching the end faces of a capacitor element at a low pressure prior to ion plating, thereby reducing the contact resistance to a value substantially equal to the theoretical value.

Briefly stated, to the above and other ends the present invention provides a method for manufacture of capacitors deposition metal by ion plating on the end faces of a capacitor element to form electrodes, and the capacitors manufactured by the above method.

DESCRIPTION OF THE PREFERRED EMBODIMENTS

Figure 1:
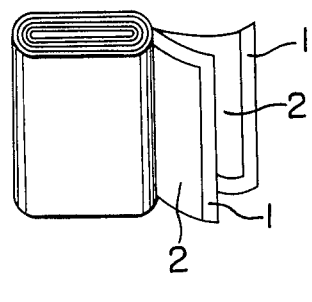
FIGS. 1 and 2 are perspective views of a roll type film capacitor and a stacked type film capacitor, respectively.
Figure 2:
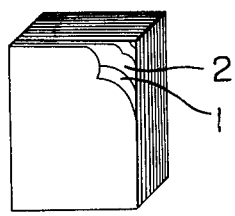

Prior to the description of the preferred embodiments of the present invention, the conventional film capacitors will be described in order to specifically point out the problems thereof. The essential parts of a capacitor are dielectric, conductors and leads, and in general the film capacitors are fabricated by coating metal 2 on polyester film 1 and cutting metal coated or metallized film and then forming them into a roll as shown in FIG. 1. The film capacitors of this type are called a roll type. Alternatively, the metal coated polyester films are laminated as shown in FIG. 2. This type of film capacitors are called a stacked type. Electrodes which are formed at the end faces of these capacitor elements serve to joint the leads, to secure the integrity of the capacitor elements and to electrically interconnect between the conductor layers on films in case of the stacked type. In general the electrodes have been formed by metal spraying in which molten metal is atomized and thrown onto the end faces of the capacitor elements with compressed air to form metal coating. More particularly, molten zinc is sprayed over one end face of a capacitor element at an angle thereto and then sprayed again at a different angle. In like manner, two Sn layers are formed. The electrode is formed on the opposite end face in the same manner. The thickness of the coating is 0.5 mm.

In metal spraying the droplets are 5 to 50 microns at the finest so that bond is poor when the end faces of a capacitor elements to be coated are smooth. In addition, metal spraying conditions are, in general, harmful to the health of workers, and the yields are low.

It has been proposed to reduce the thickness of film in order to fabricate the film capacitors which are compact in size, light in weight yet highly reliable and dependable in operation and inexpensive to manufacture.

Static capacitance C is given by $$C = ES/t$$

where
$E$ = dielectric constant,
$S$ = area of opposed electrodes, and
$t$ = thickness of a dielectric.

Figure 4:
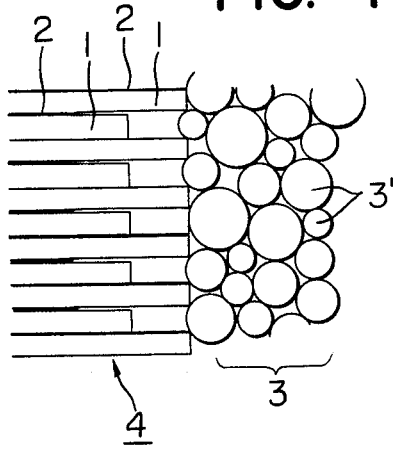
FIGS. 4 and 5 are views used for the explanation of the bonds between the end faces and the electrodes.
Figure 5:
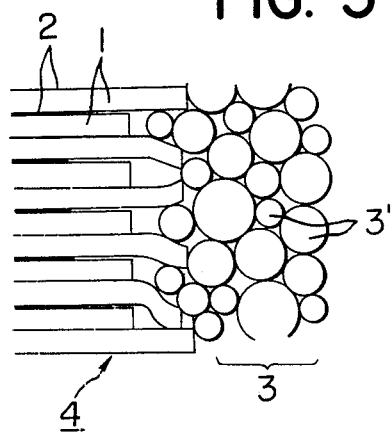
Figure 3:
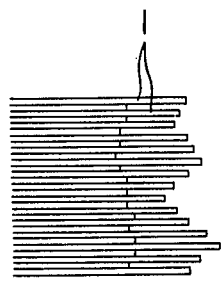
FIG. 3 is a sectional view, on enlarged scale, thereof illustrating the film edges at one end face of the capacitor element.

Therefore the volume of a film capacitor may be reduced by reducing the thickness of film, and the area of the film used may be reduced by the decrease in area of electrodes required for obtaining the same capacitance. Therefore the reduction in thickness of film is very quite advantageous in making the film capacitors compact in size and light in weight. For instance, the volume of a capacitor element consisting of films 3.5 microns in thickness is about one eighth as small as the volume of a capacitor element consisting of films 10 microns in thickness. However, the use of films 3.5 microns in thickness gives rise to the following problems when electrodes are formed by the conventional metal spraying techniques. First, in case of the roll type film capacitor shown in FIG. 1, the deviation in alignment of edges of films is generally less than 0.5 mm as shown in FIG. 3 so that no satisfactory bond between the capacitor element and the electrodes cannot be obtained and the high contact resistance results. As a result, the power loss is increased and accordingly tan δ representing the power loss is increased. In FIG. 4, there is schematically shown the bond between the capacitor element 4 and the electrode layer 3. The reason for unsatisfactory bond between them may be explained as follows. The size of sprayed molten metal droplets ranges between 5 and 50 microns so that the droplets cannot enter into the space between the adjacent films 1, resulting in weak mechanical bonds and increase in contact resistance. In practice, however, it is assumed that some particles 3' enter into the space between the adjacent films 1, forcing the edges of the films upwardly or downwardly as schematically shown in FIG. 5. However, with the deviation in alignment of less than 0.5 mm of the edges of the films, the bending of the film edges will not afford sufficient bonded strength and low contact resistance between the capacitor element and the electrodes.

The fact that the bonded strength between the electrode 3 and the smooth end face of the capacitor element 4 is low explains that the misalignment of the film edges and the size of sprayed metal droplets greatly influence the bonded strength.

However, it is not preferable to increase the misalignment among the film edges because the step for forming capacitor elements will become complex with the resulting variation in dimension and the poor yield.

Figure 6:
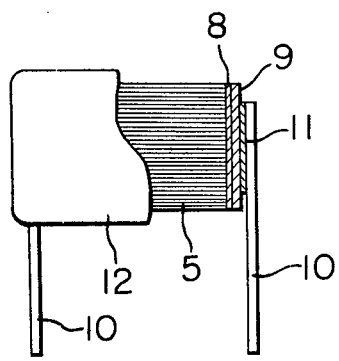
FIG. 6 is a front view, partly in section, of a film capacitor in accordance with the present invention.
Figure 7:
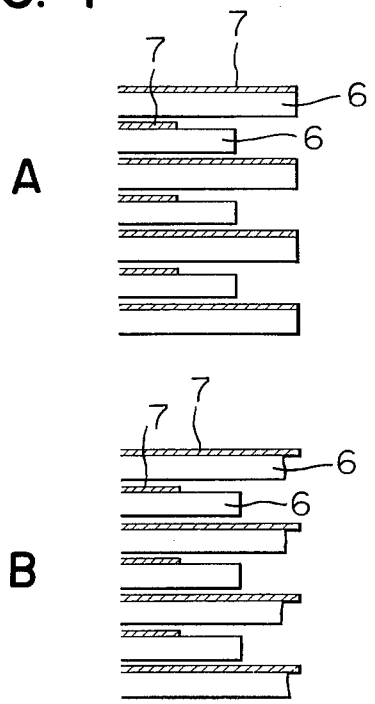
FIG. 7A is a view of film edges prior to etching.
FIG. 7B is a view thereof after etching.

Next the present invention will be described. In FIG. 6, reference numeral 5 denotes a capacitor element formed by laminating or forming into a roll film 6 (see FIG. 7) with a metal or conductor layer 7 (see FIG. 7) of aluminum. Formed on the end faces of the capacitor element 5 are electrode layers 8 by ion plating, and a conducting layer 9 is formed over the electrode layer 8 in order to increase the mechanical strength. Leads 10 are soldered to the conducting layer 9 with solder 11, and the thus assembled capacitor element is encased in a casing 12 by resin molding.

Next the ion plating used for forming the electrode layers 8 will be described briefly. In a conventional vacuum evaporation apparatus the metal to be deposited on a base or substrate which is negatively charged is heated and evaporated into fine particles, and the particles are positively charged as ionized particles and accelerated toward the base to be coated and adhered thereto. In other words, the ion plating is the method in which electroplating is carried on in a vacuum. Depending upon the methods for ionization the ion plating methods may be divided into the direct current discharge type, high-frequency excitation type and thermoelectron type.

Next some EXAMPLES for forming electrode layers in accordance with the method of the present invention will be described.

EXAMPLE 1

Because the surfaces of the capacitor element 5 are nonconductive, the bias voltage cannot be applied thereto directly in ion plating. Therefore the capacitor element 5 is made into close contact with a jig made of metal so that the bias voltage may be impressed to the jig.

Next the jig with the capacitor element mounted thereon is placed in a bell jar and made into electric contact with a bias voltage application electrode. Thereafter the bell jar is evacuated to $2 \times 10^{-5}$ torr by an vacuum pump, and Ar gas is charged into the bell to the order of $5 \times 10^{-3}$ torr. A leak valve is so adjusted that the bell jar is always maintained at $5 \times 10^{-3}$ torr during the operation. After the positive contact between the jig and the electrode has been reconfirmed, the voltage of $-1$ KV is applied to the electrode to produce glow discharge. Simultaneously, with the use of a 5 KW electron gun, Sn is evaporated so that the electrode layers 8 3 microns in thickness may be formed on the end faces of the capacitor element 5. In practice, the measurement of the thickness of the electrodes 8 being formed is not made during ion plating, but the evaporation time is controlled based on the previously obtained corelation among the power of the electron gun, the area of the end surfaces to be coated, the evaporation time and the thickness of the coatings 8. After the predetermined evaporation time, the electricity is turned off to stop glow discharge and the electron gun is also simultaneously de-energized. After the temperature of the capacitor element 5 has been dropped to a predetermined level, the pressure inside the bell jar is restored to the atmospheric pressure, and the capacitor element 5 is taken out. In restoring the pressure inside the bell jar to the atmospheric pressure, it is preferable to inject nitrogen or argon gas rather than air because the oxidation of metal coated layers 8 may be minimized.

EXAMPLE 2

Following the procedures of EXAMPLE 1, the jig with the capacitor element to be coated is placed in the bell jar. After the pressure inside the bell jar is evacuated to $5 \times 10^{-6}$ torr, argon gas is charged into the bell jar to $2 \times 10^{-4}$ torr. After the positive contact between the jig and the electrode has been confirmed, the current of the frequency of 13,56 MHz is made to flow through a high frequency coil interposed between the jig and the evaporation source, and simultaneously the electron gun of 5 KW is energized to evaporate Sn. The metal coatings 8 3 microns in thickness are formed on the opposed end faces of the capacitor element which is rotated. The high-frequency current source and the electron gun are turned off, and after the capacitor element 5 has been cooled to a predetermined temperature the pressure inside the bell jar is restored to the atmospheric pressure and then the capacitor element 5 is taken out.

EXAMPLE 3

Following the procedures of EXAMPLE 1, the jig with the capacitor element 5 is placed in the bell jar, and the bell jar is evacuated and charged with argon gas to $5 \times 10^{-3}$ torr. High frequency waves of 0.5 w/cm$^3$ is applied to the jig for 5 minutes to etch the jig. Thereafter following the procedures of EXAMPLE 1, the capacitor element 5 is coated with the electrodes 8 3 microns in thickness.

EXAMPLE 4

Following the procedures of EXAMPLE 1, the jig with the capacitor element 5 to be coated is placed in the bell jar, and the bell jar is evacuated and charged with argon gas to $5 \times 10^{-3}$ torr. Bias voltage of 200 V is impressed for 10 minutes to the jig to etch it. Thereafter following the procedures of EXAMPLE 1, the metal electrode layers 3 microns in thickness are formed.

As compared with the capacitor element 5 coated by the steps of EXAMPLE 1, the contact resistance of the capacitor elements 5 obtained by EXAMPLES 3 and 4 is low, and their tan δ is equal to the calculated value. These advantages are obtained not only by the fact that oxidized film over the metal layer A1 is removed to expose a clean surface not only by the self-etching during the ion plating but also by the etching prior to the deposition of Sn but the fact that due to the difference in etching speed between the films 6 (made of resin) and the metal coating A17 which is most resistant to etching, the metal coating A17 is extended as shown in FIG. 7B so that the area of contact between the layer 17 and Sn is increased, thus resulting in the increase in mechanical bonded strength and in the decrease in contact resistance.

Figure 8:
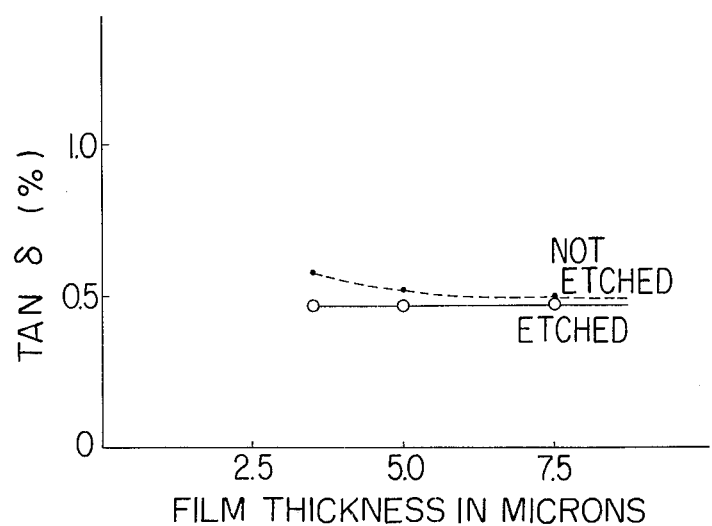
FIG. 8 is a graph illustrating the relation between the thickness of film and tan δ of the capacitors which were subjected to etching prior to ion plating and of the capacitors which were not subjected to etching.

In FIG. 8 the relation between tan δ and film thickness depending upon whether films has been etched or not is shown.

EXAMPLE 5

After the Sn coating 3 microns in thickness has been formed following the procedures of EXAMPLE 3, the bias voltage and the electron gun are turned off and the capacitor element 5 is cooled while the supply of argon gas is suspended. When the pressure inside the bell jar drops to $2 \times 10^{-4}$ torr, the electron gun is energized again to evaporate Sn and deposit it over the surfaces of the electrode layers 8 to form conducting layers 9 10 microns in thickness. Thereafter the electron gun is de-energized and after the capacitor element 5 has been cooled to a suitable temperature, the pressure inside the bell jar is restored to the atmospheric pressure to remove the capacitor element 5.

Example 5 includes a step for depositing the conducting layers 9 by vacuum evaporation so that the end faces of the capacitor element 5 must be so set as to be preceisely aligned with the evaporation source when the glow discharge is suspended. Therefore the ion plating apparatus must include a mechanism for rotating the jig through 180°. The present invention employs the vacuum evaporation in forming the conducting layers 9 in order to overcome the problems to be encountered when only ion plating is employed to form the conducting layers 9 10 microns in thickness and to make full use of the advantages of the ion plating process. When the conductive layers 9 10 microns in thickness are formed at the same speed with that of the ion plating step for forming the electrode layers 8 3 microns in thickness, the capacitor element 5 is subjected to the glow discharge for a longer time so that it is excessively heated. This phenomenon is further pronounced by the solidification of Sn. In order to overcome this problem, it may be proposed to reduce the time interval when the capacitor element 5 is subjected to the glow discharge, but the capacity of the electron gun must be increased to increase the deposition rate. As a result, heat of radiation from the evaporation source will be increased so that the capacitor element 5 will be further heated to a higher temperature, resulting in the change in quality of the films 6 and the consequent degradation of the characteristics of the capacitor. In addition the degradation of the bond between the film 6 and the metal layer 7 results. Therefore according to the present invention, the glow discharge is suspended and after the capacitor element 5 has been sufficiently cooled, the vacuum evaporation is started to form the conducting layers 9. The inventor found out that both the electric characteristics and the bonding between the capacitor element 5 and the electrode layers 8 are dependent upon the initial deposition of the metal on the end faces; that is more dependent upon the electrode layers 8 than dependent upon the conducting layers 9. Therefore as far as the electrode and conducting layers 8 and 9 are satisfactorily bonded together electrically and mechanically, the adhesion of the conducting layer to the electrode layer, the bonded strength and the density are not important factors, but it is of course apparent that the formation of the conducting layer 9 must not adversely affect the electric characteristics such as resistance of the capacitor. The above factors are taken in consideration in EXAMPLE 6 to be described below.

The advantages of the formation of the conducting layers 9 ten microns in thickness lies in that the leads may be easily bonded thereto by a conventional method such as heating by light beam.

EXAMPLE 6

Following the procedures of EXAMPLE 3, the capacitor element 5 is coated with the electrode layers 8 three microns in thickness. After being removed from the bell jar, the capacitor element 5 is reset on the jig and coated with the Sn conducting layers 9 0.2 mm in thickness by metal spraying. In this EXAMPLE the pressure in the bell jar is restored to the atmospheric pressure by charging argon or nitrogen gas after ion plating, and the ion-plated capacitor element must be subjected to metal spraying as soon as possible after it has been removed from the bell jar so that undesired increase in resistance between the electrode layer 8 and the conducting layer 9 may be prevented. In metal spraying it is preferable to use nitrogen gas rather than compressed air.

One of the most unique advantages of EXAMPLE 6 lies in that the leads 10 may be easily joined to the capacitors by the conventional method such as soldering or welding so that the modification of the step for joining the leads 10 in the existing capacitor production line is not required at all. However when the conducting layers 9 are formed by metal spraying over the electrode layers 8 formed by ion plating over the smooth end faces of the capacitor element, satisfactory electrical characteristics can be obtained, but the bond between the electrode and conducting layers is not satisfactory so that the capacitor element must be reinforced by encapsulation with resin which is shrunk when set. In metal spraying, it is preferable to use a metal same with that used in ion plating or alloy thereof or a metal which easily forms an alloy with the latter. For instance, they are Sn, Sn-Pb or Pb when Sn is used in ion plating.

EXAMPLE 7

The capacitor element 5 are formed with the electrode layers 8 following the procedures of EXAMPLE 3, and an alloy having a low melting point is soldered to the electrode layer 8 and is fused to be bonded thereto by an indirect heating method such as light beam heating, whereby the conducting layer 9 is formed.

EXAMPLE 8

Following the procedures of EXAMPLE 3, the capacitor element 5 is coated with the electrode layers 8, and after the electrode layers 8 are preheated by an infrared heater, the capacitor element 5 is dipped into a bath of an alloy having a low melting point to form the conductive layers 9.

In EXAMPLES 7 and 8, the melting point of an alloy used to form the conducting layers 9 must be lower than a temperature at which the degradation of the capacitor starts but higher than the highest temperature at which the capacitor is used.

EXAMPLE 9

Following the procedures of EXAMPLE 3, the capacitor element 5 is coated with the electrode layers 8, and the conducting layer 9 is bonded to the electrode layer 8 with conducting adhesive or paint. The adhesive paint may be one available in the market, but in order to facilitate the soldering the leads to the conducting layers 9 it is preferable that the adhesive paints to be used contain hydrochloride compound of amine.

The common advantage of EXAMPLES 7, 8 and 9 lies in that the lead wires may be easily joined by soldering or welding.

In addition to the advantages described above of the capacitors obtained by the steps of EXAMPLES 5 through 9, they have further advantages to be described below. The electrode layer 8 which is formed by ion plating has, in general, a thickness of the order of a few microns so that even though they exhibit excellent electrical characteristics, their mechanical strength such as resistance to tension, bending and the like is considerably weak. However, this disadvantage is caused by the desire for reducing the cost rather than the limit to the thickness of a metal layer formed by ion plating. That is, when it is desired to form a metal coating of a relatively greater thickness, it takes a very long time because the adverse effects of the ion plating on the electric characteristics of the capacitor elements must be avoided. When coating is formed within a relatively short time, the capacitor elements are heated to a high temperature, resulting in the degradation of qualities.

When the mechanical strength of the electrodes formed on the opposite end faces of a capacitor element for securing the shape thereof and electrically interconnecting the metal coatings on the films in case of the stacked type film capacitors is not satisfactory, the electrodes are easily susceptible to cracking when exerted to external force. Therefore, in case of the stacked type capacitors the metal coating are disconnected from each other with the resulting decrease in static capacitance. Furthermore, the contact and disconnection of the cracked electrode causes sparks, resulting in very serious damages. If a satisfactory countermeasure is taken in consideration in order to maintain desired mechanical strength, the electrode layers may be formed only by ion plating. However, even in this case, if the conducting layer 9 is formed on the electrode layer 8 in order to increase the mechanical strength and to electrically interconnect the metal coatings on the films, the capacitors which are satisfactory both in electric characteristics and mechanical strength can be obtained.

Figure 9:
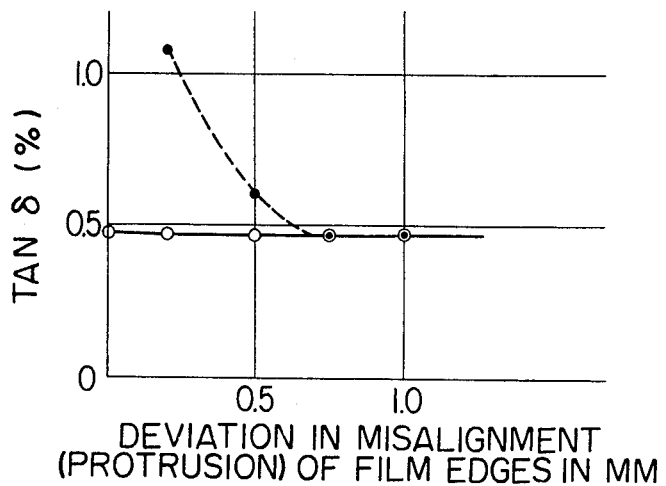
FIGS. 9 and 10 show the characteristic curves showing the relation between the misalignment of film edges and tan δ of a conventional film capacitor and the capacitor in accordance with the present invention.
Figure 10:
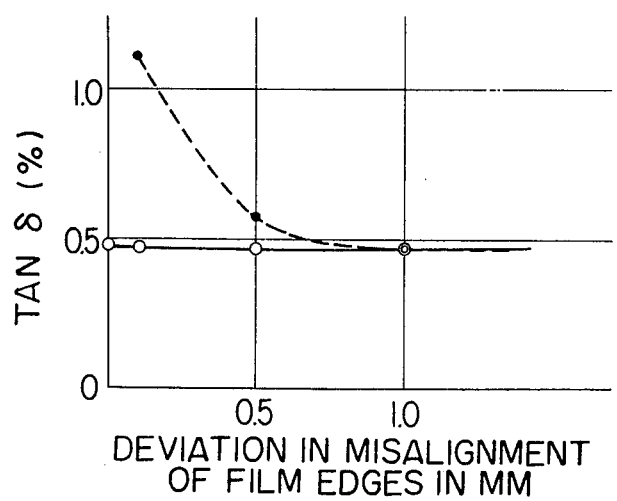

The film capacitors and method for manufacture the same in accord with the present invention have advantages to be described below. In FIGS. 9 and 10 there are shown the relations between tan δ and deviation in alignment of film edges of the capacitors with the electrodes formed by the conventional metal spraying methods and the method of the present invention. The measurements of tan δ were made at 1 MHz. It is seen that whereas tan δ of the conventional film capacitor increases as the deviation in alignment of film edges decreases as indicated by the broken line curves, the characteristic curve of the film capacitor of the present is substantially flat and tan δ is low.

Furthermore according to the present invention the electrodes may be formed on the opposed end faces of a capacitor at which the film edges are aligned.

Next the method for forming electrode layers on flat or aligned opposed end faces of a capacitor element will be described for simplifying the steps for forming capacitor elements and to attain high dimensional accuracies. The capacitor elements having flat end faces may be fabricated by a simple manner as will be described below because the step for misaligning the film edges may be eliminated. Firstly, film having a width sufficient to form a plurality of capacitor elements is continuously rolled and cut to a desired width by a cutter. Alternatively, film is cut and then rolled in such a way that the film edges may be correctly aligned or registered with each other. If the thickness of the films of thus prepared capacitor elements is less than 9 microns, not only bonded strength is weak but ohmic resistance is high. These problems are caused by the weak bonding of metal to flat or smooth surfaces which is one of the fundamental defects of metal spraying.

However, according to the present invention the end faces of the capacitor elements consisting of films less than 9 microns in thickness can be coated by ion coating with the electrodes which strongly adhere to the end faces and exhibit relatively small resistance. Furthermore, the electrode may be formed by ion plating on the flat end face of the capacitor element which may be fabricated in a far simpler manner. Thus the film capacitors of the present invention have a considerably small value of tan δ.

When the end faces of the capacitor elements are etched prior to ion plating, the area of contact between the end face and the electrode to be formed thereon may be increased. In addition, the metal coatings on the films are also etched to remove the oxidized films to expose a new surface so that the resistance between the end face and the electrode may be considerable decreased.

What is claimed is:

1. A method for manufacture of thin film capacitors which comprises providing electrodes separated by a film dielectric to form a capacitor element with two opposed end faces, etching the opposed end faces of said capacitor element without use of liquid etchants, and depositing terminals by ion plating metal on each of the opposed end faces of the capacitor element.

2. The method for manufacture of film capacitors of claim 1 wherein a conducting layer is formed on said terminals to increase mechanical strength thereof.

3. A method as set forth in claim 2 wherein said conducting layer is formed by coating said terminals with an alloy having a melting point lower than the temperature at which gradation of the capacitor occurs.

4. A method as set forth in claim 2 wherein said conducting layer is formed by vacuum evaporation.

5. The method of claim 1 wherein the opposed end faces of said capacitor element are etched by dry etching of the spattering function of argon gas.

* * * * *

UNITED STATES PATENT OFFICE
CERTIFICATE OF CORRECTION

Patent No. 4,102,021     Dated July 25, 1978

Inventor(s)     Kaname Nakao, et al

It is certified that error appears in the above-identified patent and that said Letters Patent are hereby corrected as shown below:

Column 2, line 32:  "object" should be inserted after "one"

line 58:  "deposition" should be --depositing--

Column 5, line 26:  "corelation" should be --correlation--

Column 6, line 40:  "deposite" should be --deposit-- line 50:  "preceisely" should be --precisely--

*Signed and Sealed this*

*Fifteenth* Day of *May 1979*

[SEAL]

*Attest:*

RUTH C. MASON
*Attesting Officer*

DONALD W. BANNER
*Commissioner of Patents and Trademarks*